(12) United States Patent
Holtz

(10) Patent No.: US 10,284,547 B2
(45) Date of Patent: *May 7, 2019

(54) FACILITATING USERS TO OBFUSCATE USER CREDENTIALS IN CREDENTIAL RESPONSES FOR USER AUTHENTICATION

(71) Applicant: Electronic Arts Inc., Redwood City, CA (US)

(72) Inventor: Brian Holtz, Los Altos Hills, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,770

(22) Filed: Dec. 14, 2017

(65) Prior Publication Data

US 2018/0124036 A1    May 3, 2018

Related U.S. Application Data

(63) Continuation of application No. 14/923,298, filed on Oct. 26, 2015, now Pat. No. 9,876,782, which is a continuation of application No. 14/028,146, filed on Sep. 16, 2013, now Pat. No. 9,172,697.

(51) Int. Cl.
*H04L 29/06* (2006.01)

(52) U.S. Cl.
CPC .................. *H04L 63/083* (2013.01)

(58) Field of Classification Search
CPC .................................................. H04L 63/083
See application file for complete search history.

(56) References Cited

U.S. PATENT DOCUMENTS

| | | | |
|---|---|---|---|
| 8,250,635 B2 | 8/2012 | Chari | |
| 8,281,147 B2 | 10/2012 | Florencio | |
| 9,172,697 B1 * | 10/2015 | Holtz | H04L 63/083 |
| 9,876,782 B2 * | 1/2018 | Holtz | H04L 63/083 |
| 2002/0029341 A1 | 3/2002 | Juels | |
| 2005/0262555 A1 | 11/2005 | Waterland | |
| 2005/0273625 A1 | 12/2005 | Dayan | |
| 2006/0143138 A1 | 6/2006 | Uehara | |
| 2007/0124601 A1 | 5/2007 | Singh | |
| 2008/0320310 A1 | 12/2008 | Florencio | |
| 2010/0071046 A1 | 3/2010 | Seethana | |
| 2016/0044020 A1 | 2/2016 | Holtz | |

OTHER PUBLICATIONS

Halderman, J. Alex, et al., "A Convenient Method for Securely Managing Passwords", Proceedings of the 14th International World Wide Web Conference (WWW 2005), May 10-14, 2005, 9 pages.

* cited by examiner

*Primary Examiner* — Matthew Smithers
(74) *Attorney, Agent, or Firm* — Knobbe, Martens, Olson & Bear, LLP

(57) ABSTRACT

A system and method for facilitating users to obfuscate user credentials in credential responses for user authentication are disclosed. A string sequence may be presented to a user for prompting the user to input credential characters sequentially but not continuously. The string sequence may comprise a set of prompt strings containing a prompt character sequence associated with the user and a set of noise strings that do not contain the prompt character sequence. The individual prompt strings in the set of prompt strings may be composed by obfuscating the prompt sequence among noise characters. A user credential response may be received and a user provided credential may be extracted from the received user credential for user authentication.

18 Claims, 6 Drawing Sheets

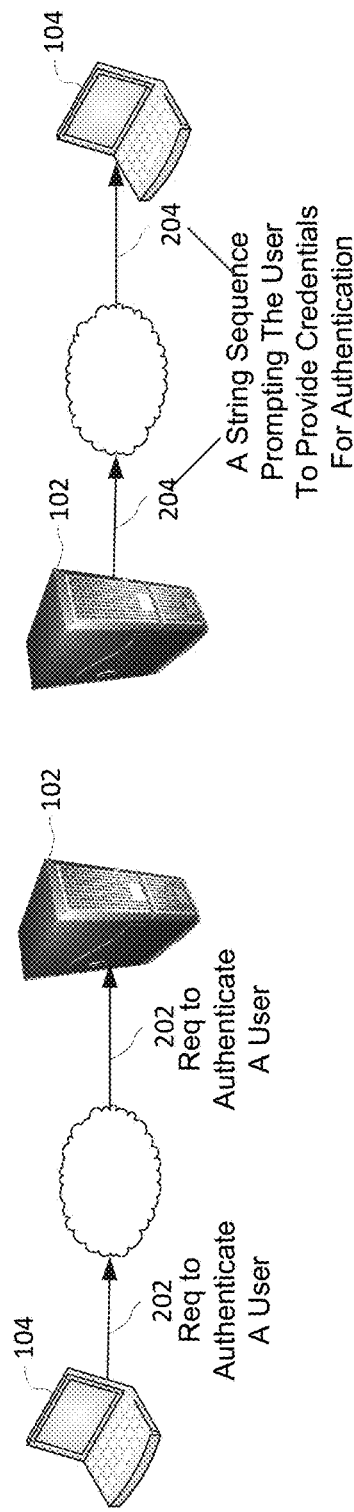
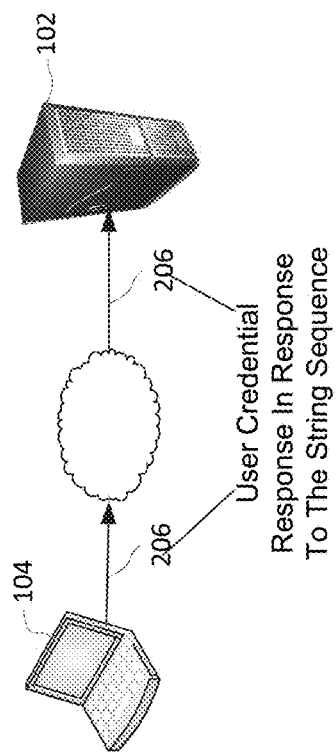
FIG. 2A
FIG. 2B
FIG. 2C

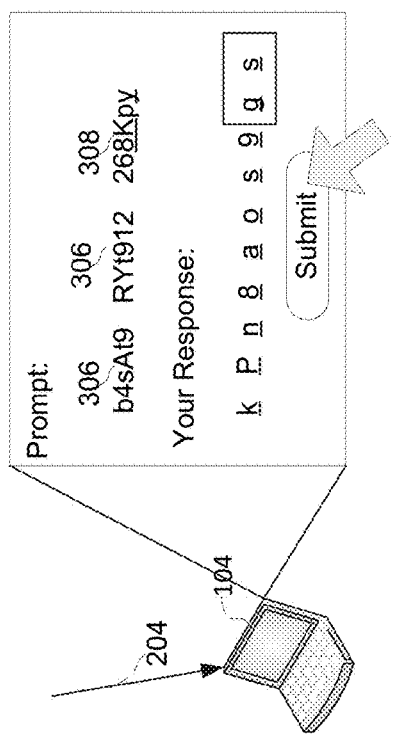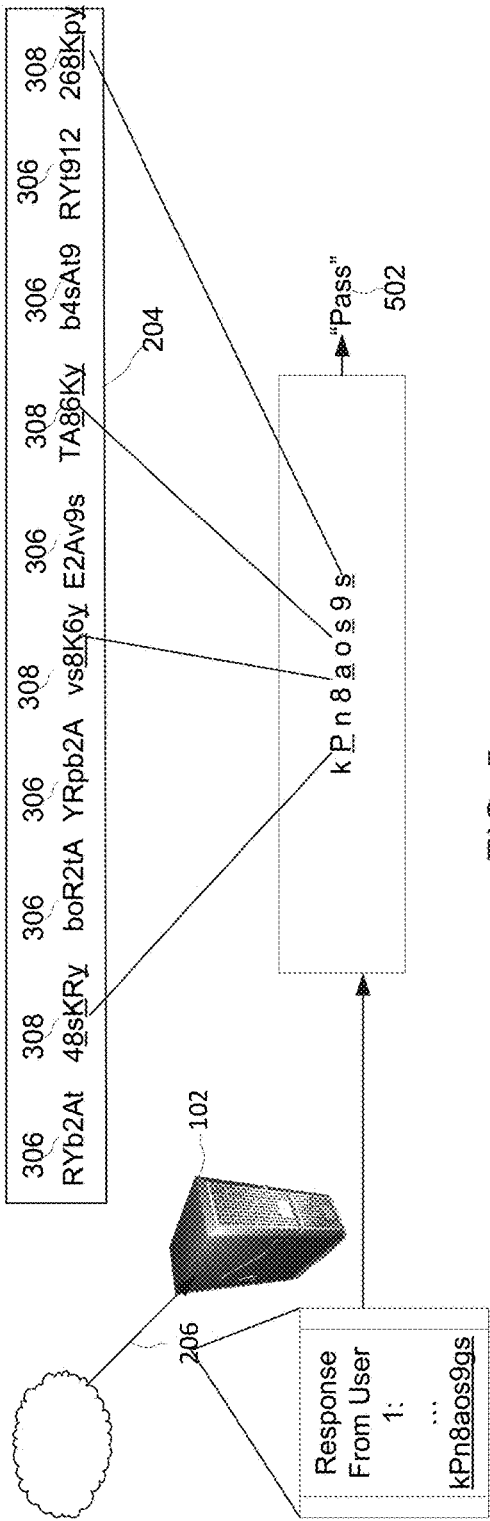

his disclosure relates to user authentication, the user authentication being enabled by facilitating users to obfuscate their credentials in credential responses.

FACILITATING USERS TO OBFUSCATE USER CREDENTIALS IN CREDENTIAL RESPONSES FOR USER AUTHENTICATION

FIELD OF THE DISCLOSURE

This disclosure relates to user authentication, the user authentication being enabled by facilitating users to obfuscate their credentials in credential responses.

BACKGROUND

Systems that enable users to provide obscured passwords by using a sequence of images during user authentication processes are known. In order to authorize an access request by a user from an untrusted domain, e.g., such as a third party domain, those systems present the user a sequence of images during the authorization process. The sequence of images contains images recognizable to the user such that the user is instructed to input characters in the password upon those images being presented during the authentication process; and contains images not recognizable to the user such that the user is instructed to input random characters—i.e., characters that are not in the password during the authentication process.

SUMMARY

One aspect of the disclosure relates to facilitating users to obfuscate credentials in credential responses by using string sequences comprising prompt character sequences interspersed with arbitrary characters not in the prompt character sequences. A string sequence may be constructed for a user and may contain a set of prompt strings mixed with a set of noise strings such that the prompt strings are scattered in the string sequence randomly. The individual prompt strings in string sequence may be composed such that the individual prompt strings contain a prompt character sequence associated with the user. In some examples, the prompt character sequence may contain alpha-numerical characters. Such a prompt character sequence may be provided to the user prior to user authentication and may be updated periodically. In some exemplary implementations, an individual prompt string may be composed by interspersing the prompt character sequence with noise characters without rearranging the order of prompt character sequence.

Such a string sequence may be presented on a client computer associated with the user and prompt the user to provide a credential response such that the user may input characters in his/her credential sequentially upon recognizing the prompt character sequence in the prompt strings presented on the client computer; and to input random characters upon presentation of noise strings in the string sequence. Accordingly, the user credential response facilitated by the string sequence may comprise user provided credential obfuscated among random characters. Such a user credential response may be received and the user provided credential may be extracted from the received credential response based on the string sequence that facilitates the user to provide the credential response. Unlike the traditional systems wherein sequences of images are generated, the system in accordance with the disclosure generates string sequences for facilitating users to obfuscate their credentials in credential responses with enhanced strength such that the credential responses are difficult to be hacked by intruders, and the string sequences may be updated cost-effectively.

In some implementations, the system configured to facilitate users to obfuscate user credentials in credential responses comprises a server. The server may be configured to execute computer program modules. The computer program modules may include one or more of a user module, user authentication request module, prompt character sequence module, noise character module, prompt string module, noise string module, string sequence module, user credential response module, and/or other modules.

The user module may be configured to access and/or manage one or more user profiles and/or user information associated with users. The user profiles and/or user information may include, for example, information indicating user credentials for authenticating the users, such as, but not limited to, information identifying the users (e.g., a username or handle, a number, an organization/department the users belong to, an identifier, and/or other identifying information), security login information (e.g., a login code or password), client computing platform identifications associated with users, and/or other information related to users.

The user authentication request module may be configured to receive user authentication requests for authenticating users. In some examples, a user authentication request received by the user authentication request module may initiate an authentication process to authorize a user for accessing resources and/or services. In some other examples, such a user authentication request may request a confirmation of a user's identity for a third party entity. A given authentication request received by the user authentication request module may include user identity information, information regarding the third party entity that transmits the authentication request, user information regarding the user for whom the user authentication request is made, and/or any other information that may be included in a user authentication request received by the user authentication request module.

The prompt character sequence module may be configured to obtain prompt character sequences associated with the users for whom the user authentication requests received by the user authentication request module are made. The obtained prompt character sequences may be used, for example, by the prompt string module to compose prompt strings. In some examples, a prompt character sequence associated with a given user may comprise alpha-numerical characters, ASCII characters, international characters (e.g., such as Kenji, Big-5, GB, Russian, Korean and so on), symbols, Unicode code points, and/or any other types of characters. In some exemplary implementations, such a prompt character sequence may be determined during user registration and stored in the user accounts managed by the user module. In some exemplary implementations, the prompt character sequences may be determined dynamically by the prompt character sequence module for the users during runtime of the system. In those implementations, the dynamically determined prompt character sequences may be transmitted to users periodically via any suitable communication medium such as, but not limited to, email, wireless communications, token transmission, and/or any other communication medium.

The noise character module may be configured to obtain, for individual users, noise characters, which may be used by, for example, the prompt string module to obfuscate the prompt character sequence for composing prompt strings. In some examples, the noise characters obtained by the noise character module for a given user may comprise characters that are not in the prompt character sequence associated with the given user as obtained by the prompt character sequence module. In some exemplary implementations, the noise character module may be configured to obtain the noise characters for a given user by randomly generating the noise characters from a set of characters. In some exemplary implementations, the noise character module may be configured to obtain characters that are similar to those appear in the prompt character sequences associated with the given user.

The prompt string module may be configured to compose prompt strings by obfuscating the prompt character sequence obtained by the prompt character sequence module. In some examples, the prompt string module may compose the prompt strings by interspersing the prompt character sequences with the noise characters obtained by the noise character module without rearranging the order of the prompt character sequence such that the composed prompt strings no longer comprise continuous prompt character sequences in the corresponding prompt strings. For example, for a given user, a set of noise characters determined by the noise character module may be inserted in front of, between, and/or at the end of the prompt character sequence associated with the given user randomly to form a sequence making up the prompt string. In some exemplary implementations, for a given user, the prompt string module may be configured to compose a set of multiple prompt strings, which may be employed, for example, by the string sequence module to compose string sequences. In some examples, individual prompt strings in a set of prompt strings composed by the prompt string module for the given user may be of identical length. In some other examples, the number of prompt strings and length of individual prompt strings in a set of prompt strings composed by the prompt string module for the given user may vary as desired. In some exemplary implementations, the prompt strings in the set of prompt strings composed by the prompt string module may be unique with respect to one another within the set, and may not repeat across different sets of the prompt strings previously composed by the prompt string module in response to previous user authentication requests for a given user.

The noise string module may be configured to obtain noise strings, which may be used by, for example, the string sequence module for obfuscating the prompt strings composed by the prompt string module. For such obfuscation, the noise strings obtained by the noise string module may not comprise prompt character sequences associated with the users as obtained by the prompt string module. In some examples, the noise string module may obtain the noise strings by composing the noise strings using noise characters determined by the noise character module. In some examples, the number of noise strings for inclusion in such a noise string set may be predetermined and configured with the noise string as desired. In one example, programming rules may be configured into the noise string module such that the number of the noise strings in the noise string set composed by the noise string module is three times of the number of the prompt strings in the set of prompt strings composed by the prompt string module for a given user. In some examples, the noise strings composed by the noise string module in a noise string set for a given users may have the same length as that of the prompt strings in the prompt string set composed by the prompt string module for a given user. In some examples, the noise strings composed by the noise string module in a noise string set for the given users may have the same length as that of the prompt strings in the prompt string set composed by the prompt string module for a given user. In some exemplary implementations, the noise strings in the noise string set composed by the noise string module may not be identical within the noise string set, and may not repeat across different noise string sets previously composed by the noise string module in response to different user authentication request for a given user.

The string sequence module may be configured to construct string sequences to facilitate users to provide credential responses for user authentication. For facilitating a given user to provide a credential response, a string sequence constructed by the string sequence module may comprise a set of prompt strings composed by the prompt string module and a set of the noise string composed by the noise string module. In some exemplary implementations, to construct such a string sequence, the string sequence module may mix the noise strings with the prompt strings such that the prompt strings are scattered in the constructed string sequence randomly among the noise strings. In some examples, a string sequence constructed by the string sequence module for the give user in response to a user authentication request to authenticate the given user may be unique with respect to string sequences previously constructed by the string sequence module for authenticating the given user.

The string sequences constructed by the sting sequence module may be transmitted to client computers for presentation to facilitate users providing credential responses for user authentication. Instructions may be provided to the users to provide credential responses in accordance with the string sequences presented on the client computers associated with the users such that the user may obfuscate their credentials among random characters. In some examples, a given user may be instructed to submit a credential response after the given user has finished inputting the last character of his/her credential despite that there may be more strings (prompt strings and/or noise strings) in the string sequence presented on the user computer. In some examples, however, the user may be instructed to continue inputting random characters after the last character in his/her credential has been input and submit the credential response until the last string in the string sequence has been presented.

The user credential response module may be configured to receive user credential response from the client computers. The received user credential response may include user provided credentials obfuscated among other random characters for user authentication. The user credential response module may extract user provided credentials in the received user credential response based on the corresponding string sequences in accordance with which the user provided credentials are input on the client computers. In some examples, the user credential response module may be configured to authenticate the use by comparing the extracted credentials provided by the users with the user credential stored in the user account managed by the use module. In some other examples, the user credential response module may relay the extracted user provided credential to an authentication server to authenticate the users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates one example of receiving a user authentication request for authenticating a user of the system shown in FIG. 1.

FIG. 2B illustrates an example of transmitting a string sequence to the client computing platform shown in FIG. 2A in response to receiving the user authentication request also shown in FIG. 2A.

FIG. 2C illustrates an example of transmitting a user credential response provided by the user in response to the string sequence illustrated in FIG. 2B.

FIG. 4E illustrates an example of presenting 8th, 9th and 10th strings in the string sequence on the client computing platform.

FIG. 5 illustrates an example of extracting a user provided credential from a user credential response shown in FIG. 4E.

DETAILED DESCRIPTION

Figure 1:
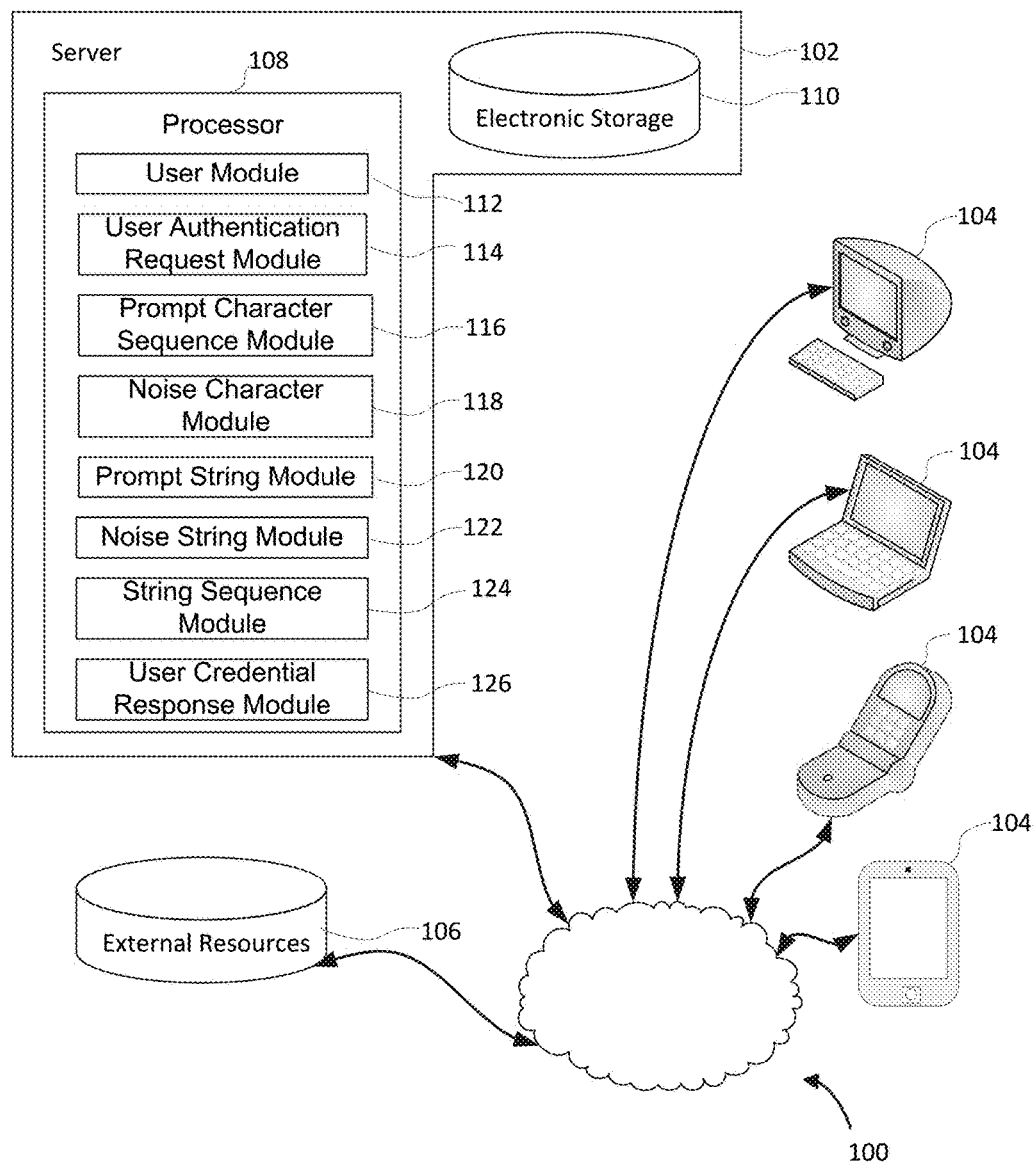
FIG. 1 illustrates a system configured to facilitate users to obfuscate user credentials for authentication.

FIG. 1 illustrates a system 100 configured to facilitate users to obfuscate user credentials for authentication. In some implementations, system 100 may include a server 102. As shown in this example, the server 102 may be configured to communicate with one or more client computing platforms 104 according to a client/server architecture to facilitate user authentication—i.e., the server 102 may authenticate users for accessing resources and/or services on the sever 102 and/or provided by other servers (e.g., cloud servers, database servers, servers that provide server side logic for execution on the client computer platforms, and/or any other servers), network storage (e.g., cloud storage), devices, networks (e.g., industry control networks), and/or any other entities that may require user authentication for accessing resources and/or services provided by the entities. However, it is contemplated that in some other examples, the server 102 may be configured to interface with an authentication server (not shown in this example) to supplement the authentication server with some or all of functionalities of the server 102 described herein. For example, system server 102 may interface with the authentication server via one or more application programming interfaces.

The server 102 may be configured to execute one or more computer program modules. The computer program modules may include one or more of a user module 112, user authentication request module 114, prompt character sequence module 116, noise character module 118, prompt string module 120, noise string module 122, string sequence module 124, user credential response module 126, and/or other modules.

The user module 112 may be configured to access and/or manage one or more user profiles and/or user information associated with users of the system 100. The one or more user profiles and/or user information may include information stored by server 102, one or more of the client computing platforms 104, and/or other storage locations. The user profiles and/or user information may include, for example, information indicating user credentials for authenticating the users, such as, but not limited to, information identifying users (e.g., a username or handle, a number, an identifier, and/or other identifying information), security login information (e.g., a login code or password), client computing platform identifications associated with users, and/or other information related to users. Such user credential information may be used by the server 102 to effectuate user authentications for authorizing the users to access resources and/or services provided by the system 100. Such user credential information may be used by the server 102 to confirm user identities and provide user information stored in system 100 associated with the identified users to a third party entity associated with the system 100 (e.g., a relying server).

The user authentication request module 114 may be configured to receive user authentication requests for authenticating users. In some examples, a user authentication request received by the user authentication request module 114 may initiate an authentication process to authorize a user to access resources associated with the system 100. In those examples, the server 102 may interface with client computing platforms 104 for receiving the user authentication requests, as illustrated in this example. However, this is not necessarily the only case. In some other examples, a user authentication request received by the user authentication request module 114 may request a confirmation of a user's identity associated with the system 100. For example, in some instances, the system 100 may function as user identity provider facilitating third party organizations authorizing users for accessing resources and/or services provided the by the third party organizations. For example, a third party internet service provider may rely on system 100 to confirm identities of users for providing services to the users. In those examples, the server 102 may interface with a server of the third party entities for receiving user authentication requests.

In any case, a given authentication request received by the user authentication request module 114 may include user identity information such as a username, a real name of the user, a client computing platform associated with the user, a network interface card registered by the user, an identification number associated with the user, and/or any user identity information. In some examples, the authentication request received by the user authentication request module 114 may include information such as information regarding the third party entity that transmits the authentication request to the server 102 via system 100 (e.g., the name of the third party entity, services and/or resources provided by the third party entity that need user authentication by the server 102, the location of the third party entity, and/or any other information regarding the third party entity), information regarding the user for whom the user authentication request is made (e.g., an organization the user belongs to, a phone number associated with the user, a mailing address associated with the user, an email address associated with the user and/or any other user information), and/or any other information that may be included in a user authentication request received by the user authentication request module 114.

The prompt character sequence module 116 may be configured to obtain prompt character sequences associated with the users for whom the user authentication request received by the user authentication requests module are made. The obtained prompt character sequences may be used, for example, by the prompt string module 120 to compose prompt strings for the user. In some examples, a prompt character sequences associated with a given user may comprise alpha-numerical characters, ASCII characters, international characters (e.g., such as Kenji, Big-5, GB, Russian, Korean, and so on), symbols, Unicode code points, and/or any other types of characters. By way of a non-limiting example, a prompt character sequence associated with a given user may be made of a three character sequence such as "856", "tyu", "Yku", "Z5e", "a3T", and so on. However, this is merely illustrative; in some other examples, the length of the prompt character sequences may vary as desired by the users, administrator(s), provider(s) of the system 100 and/or any other entities that may determine prompt characters.

In some exemplary implementations, such prompt character sequence may be determined during registration of a user and stored in the user profile and/or information managed by the user module 112. For example, a user may specify a prompt character sequence when the user registers with the system 100. In some exemplary implementations, the prompt character sequences may be determined dynamically by the prompt character sequence module 116 for the users during runtime of the system 100 and stored in the user profile and/or information managed by the user module 112. For example, the administrator(s) and/or provider(s) of the system 100 may configure the user module 112 to determine prompt character sequences for users via a graphical interface or at predetermined frequencies automatically. In those examples, the determined prompt character sequence may be provided to the users periodically through any suitable communication medium. For example, a prompt sequence dynamically determined for a given user by the prompt character sequence module 116 may be transmitted to an email account associated with the given user. In another example, the dynamically determine prompt sequence may be transmitted to the given user via a portable device (e.g., a RSA token device, a smart phone, and so on) associated with the user periodically. By way of a non-limiting example as illustration, the prompt character sequence module 116 may determine random prompt character sequences every 6 hours for a user. The determined prompt character may be encrypted and communicated to the user via an email account of the user registered with system 100 at the end of the every 6 hour period.

The noise character module 118 may be configured to obtain noise characters, which may be used by, for example, the prompt string module 120 to obfuscate the prompt character sequences obtained by the prompt character sequence module 116 for composing prompt strings. In some examples, the noise characters obtained by the noise character module 118 may comprise characters that are not in the prompt character sequences obtained by the prompt character sequence module 116. In some of those examples, for obtaining such noise characters for an individual user, the prompt character sequence module 116 may identify characters in the prompt character sequence associated with the individual user, and determine characters for inclusion as the noise characters for the user. In some examples, the noise characters may be obtained from character classes corresponding to those that make up the characters in the prompt character sequence for a given user. For example, in a case where the characters in the prompt character sequence for the given users are alpha-numerical, the noise character module 118 may obtain noise characters for the given user that are also alpha-numerical. In another case where the prompt character sequence is made of lower case characters, the noise character module 118 may obtain lower case characters that are not those characters in the prompt character sequence as noise characters.

In some exemplary implementations, the noise character module 118 may be configured to obtain the noise characters for a given user by randomly generating the noise characters from a set of characters. For example, the noise character module 118 may generate noise characters randomly from a set of alpha-numerical characters that are not in the prompt sequence for the given user. In some exemplary implementations, a quantity of noise characters that may be generated for the given user may be predetermined by, for example, the developer, administrator, provider of the system 100 and/or any other entities associated with system 100. For example, the noise character module 118 may be preconfigured to generate a number of noise characters 3 times of the number of characters in the prompt character sequence for a given user. For instance, in the case where the prompt character sequence is 3 characters long, the noise character module 118 may generate 9 noise characters accordingly.

In some exemplary implementations, the noise character module 118 may be configured to obtain characters that are similar to those appearing in the prompt character sequences for a given user. For example, in a case where the prompt character sequence for user is "a5w", the noise character module 118 may be configured with programming rules to obtain noise characters similar to "a", "5", "w" such as, without limitation, "A", "S", "W", "s", and so on. This may increase the strength of a prompt string composed by the prompt string module 120 described below.

The prompt string module 120 may be configured to compose prompt strings by obfuscating the prompt character sequence obtained by the prompt character sequence module 116. In some examples, the prompt string module 120 may compose the prompt strings by interspersing the prompt character sequences with the noise characters obtained by the noise character module 118 without rearranging the order of the prompt character sequence such that the prompt strings no longer comprise continuous prompt character sequences in the corresponding prompt strings. For example, for a given user, a set of noise characters determined by the noise character module 118 may be inserted in front of, between, and/or at the end of the prompt character sequence to form a sequence to make up the prompt string. By way of non-limiting example, in the case where a set of noise characters for a given user, as determined by the noise character module 118, contains "5", "y", "t", "G" and the prompt character sequence for the given user, as obtained by the prompt character sequence module 116, is "r4D", the prompt string module 120 may obfuscate the prompt character sequence "r4D" by inserting "y" in front of "r4D", inserting "5" between "r" and "4", inserting "G" between "4" and "D", and inserting "t at the end of "r4D" to compose a prompt string—"yr54GDt".

In some exemplary implementations, in response to a user authentication request received by the user authentication request module 114, the prompt string module 120 may be configured to compose a set of multiple prompt strings, which may be employed, for example, by the string sequence module 122 to compose string sequences. In those implementations, for composing the set of multiple prompt strings, the prompt string module 120 may obtain a size (i.e. the quantity of the prompt strings) for the set of multiple prompt strings. In some examples, such a size may be predetermined and configured with the prompt string module 120 by the developer(s), administrator(s), provider(s), and/or any other entities related to the system 100. For instance, the prompt string module 120 may be configured to compose the set of prompt strings for a given user for no more than a maximum length that is allowed for a user credential to be within the system 100. As an illustration, in the case where system 100 allows a user to have a user credential, e.g., user password, to be at most 12 character long, the prompt string module 120 may be configured to compose 12 prompt strings for inclusion in the set of prompt strings to be used by the string sequence module 122.

In some examples, individual prompt strings in a set of prompt strings composed by the prompt string module 120 for a given user may be of identical length. For instance, in the case where the prompt string module 120 composes a set of 12 prompt strings for a given user, the 12 prompt strings may be composed by the prompt string module 120 such that they are all of the same length, say 8 character long—with 4 characters being characters in the prompt character sequence and 4 characters being the noise characters. In some other examples, the number of prompt strings and length of individual prompt strings in a set of prompt strings composed by the prompt string module 120 for the given user may vary as desired by the developer, administrator, provider of the system 100 and/or any other entities related to the system 100. For example, the prompt strings in the set of prompt strings composed by the prompt string module 120 for the given user may be of variable length.

The noise string module 122 may be configured to obtain noise strings, which may be used by, for example, the string sequence module 124 for obfuscating the prompt strings composed by the prompt string module 120. For such obfuscation, the noise strings composed by the noise string module 122 may not comprise prompt character sequences associated with the users. In some examples, the noise string module 122 may obtain the noise strings by composing the noise strings using noise characters determined by the noise character module 118. For example, in response to a user authentication request received by the user authentication request module 114, the noise string module 122 may compose a set of noise strings using noise characters determined by the noise character module 118. In some examples, the number of noise strings for inclusion in such a noise string set may be predetermined and configured with the noise string module 122 by the administrator, developer, provider, and/or any other entities related to the system 100. In one example, programming rules may be configured into the noise string module 122 such that the number of the noise strings in the set of noise strings composed by the noise string module 122 is three times of the number of the prompt strings in the set of prompt strings composed by the prompt string module 120 for a given user. As an illustration, thus not intended to be limiting, in a case where the prompt string module 120 composes 12 prompt strings for a given user in response to a user authentication request, the noise string module 122 may be configured to compose 36 noise strings that do not comprise the prompt character sequence associated with the given user.

In some examples, the noise strings composed by the noise string module 122 in a set for a given users may have the same length as that of the prompt strings in the prompt string set composed by the prompt string module 120 for a given user. For example, in the case where the prompt string module 120 composes 12 prompt strings with equal length of 8 characters long for a given user, the noise string module 122 may compose the set of noise strings for the given user to also be 8 characters long.

Figure 3:
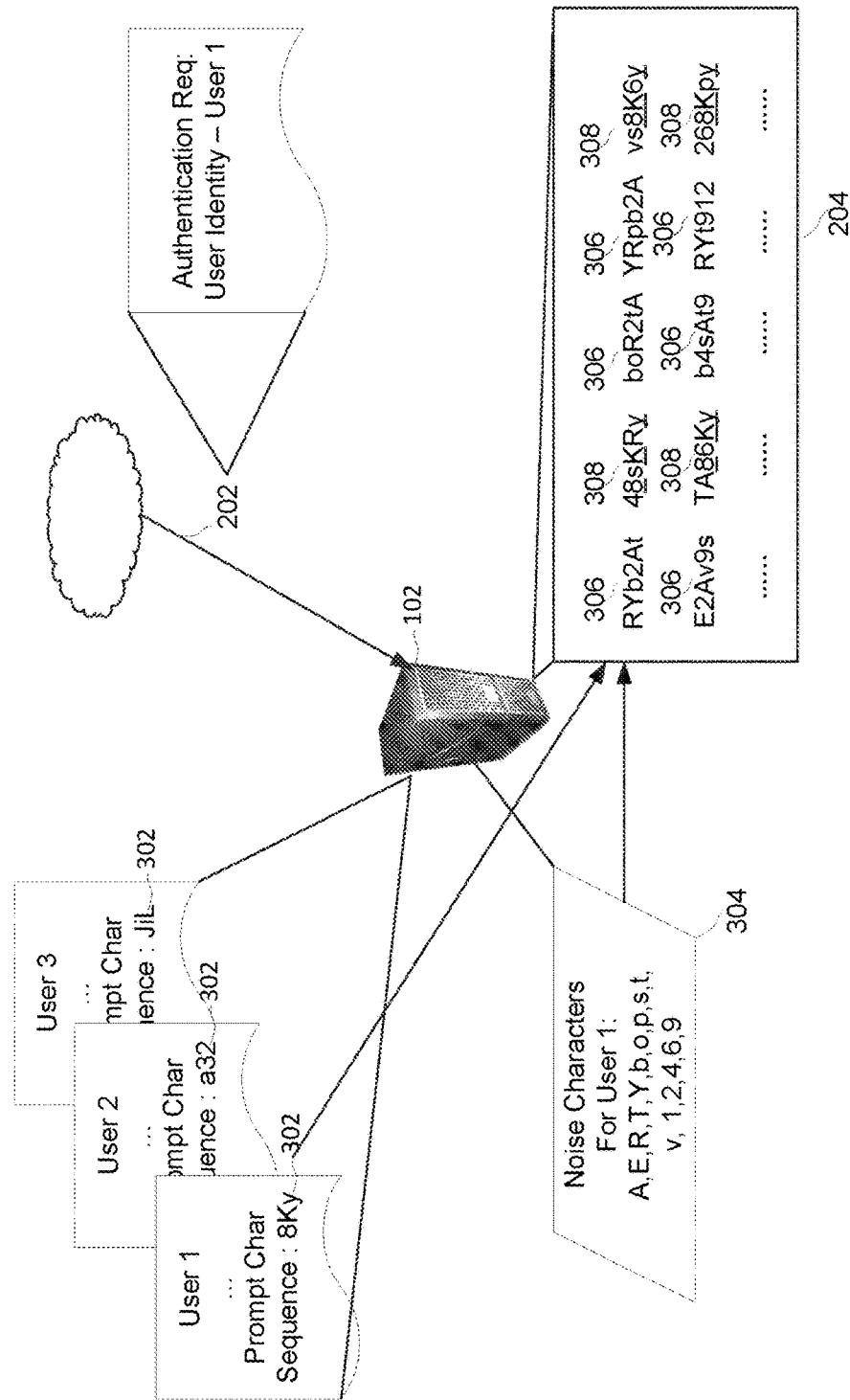
FIG. 3 illustrates an example of constructing a string sequence in accordance with the disclosure.

The string sequence module 124 may be configured to construct string sequences to facilitate users providing credential responses for user authentication. For facilitating a given user providing a credential response, a string sequence constructed by the string sequence module 124 may comprise a set of prompt strings composed by the prompt string module 120 and a set of the noise string composed by the noise string module 122. In some exemplary implementations, to construct such a string sequence, the string sequence module 124 may mix the noise strings with the prompt strings such that the prompt strings are scattered in the constructed string sequence randomly. An example of such a string sequence is illustrated in FIG. 3.

The string sequences constructed by the sting sequence module 124 may be transmitted to client computing platforms 104, e.g., via the server 102 and/or any other intermediate server(s) such as a third party server associated with the system 100, for presentation to facilitate users providing credential responses for user authentication. Instructions may be provided to the users to provide credential responses in accordance with the string sequences presented on the client computing platforms 104 associated with the users such that the user may obfuscate the credentials among random characters. For example, a given user may be instructed to input credential characters when prompt strings containing an obfuscated prompt character sequence associated with the given user are presented and recognized by the given user in the string sequence; and to input random—i.e., arbitrary characters when noise strings are presented in the string sequence. An example of using a string sequence to facilitate a given user providing a credential response for user authentication is illustrated in FIGS. 4A-E.

In some examples, the user may be instructed to submit a credential response after the use has finished inputting the last character of his/her credential despite that there may be more strings (prompt strings and/or noise strings) in the string sequence presented on the user computer 104. For instance, in the case where the string sequence contains 12 prompt strings mixed with 26 noise strings randomly and the length of the user credential is 5 characters long, the user may be instructed to submit the credential response upon recognizing the 5th prompt string presented in the string sequence. In some examples, however, the user may be instructed to continue inputting random characters after the last character in his/her credential has been input and submit the credential response until the last string in the string sequence has been presented.

The user credential response module 126 may be configured to receive user credential response from the client computing platforms 104. In some examples, the user credential response may be received by the user credential response module directly from the client computing platform 104 via server 102. In those examples, as described above, the server 102 may interface with the client computing platforms 104 for such communication. In some other examples, the user credential response may be relayed to the user credential response module from the user client computing platform 104 via an intermediate server, e.g., such as a third party server that relies on system 100 to authenticate the users for accessing resources and/or services provided by the entity associated with the third party server. In any case, the received user credential response may include user provided credentials obfuscated among other random characters for user authentication. For example, the user provided credential may scatter in the received credential response sequentially the but not continuously as the user input the credential characters in accordance with the string sequence presented on the client computing platform 104 associated with the user. An example of credential response received by the user credential response module 126 is illustrated in FIG. 5.

The user credential response module 126 may be configured to extract user provided credentials in the received user credential response based on the corresponding string sequences in accordance with which the user provided credentials are input on the client computing platforms 104. In some exemplary implementations, for extracting a user provided credential from a given user credential response, the user credential response module 126 may obtain information indicating positions of the prompt strings in the corresponding string sequence. Such position information may be employed by the user credential response module 126 to extract the credential character from the received credential response by the user. As an illustration, thus not intended to be limiting, in a case where the string sequence indicates that prompt strings are located at positions 3, 6, 7, 10, 12, 15, 16, 20 in the string sequence, the user credential response module 126 may extract characters at those positions in the credential response as the credential characters. In some examples, the user credential response module may be configured to authenticate the use by comparing the extracted credentials provided by the users with the user credential stored in the user account managed by the use module 112. In some other examples, the user credential response module may relay the extracted user provided credential to an authentication server for authenticating the users.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120, 122, 124, 126. Processor 108 may be configured to execute modules 112, 114, 116, 118, 120, 122, 124, 126 by software; hardware; firmware; some combination of software, hardware, and/or firmware; and/or other mechanisms for configuring processing capabilities on processor 108.

It should be appreciated that although modules 112, 114, 116, 118, 120, 122, 124, 126 are illustrated in FIG. 1 as being co-located within a single processing unit, in implementations in which processor 108 includes multiple processing units, one or more of modules 112, 114, 116, 118, 120, 122, 124, 126 may be located remotely from the other modules. The description of the functionality provided by the different modules 112, 114, 116, 118, 120, 122, 124, 126 described below is for illustrative purposes, and is not intended to be limiting, as any of modules 112, 114, 116, 118, 120, 122, 124, 126 may provide more or less functionality than is described. For example, one or more of modules 112, 114,

116, 118, 120, 122, 124, 126 may be eliminated, and some or all of its functionality may be provided by other ones of modules 112, 114, 116, 118, 120, 122, 124, 126. As another example, processor 108 may be configured to execute one or more additional modules that may perform some or all of the functionality attributed below to one of modules 112, 114, 116, 118, 120, 122, 124, 126.

FIGS. 2A-C illustrate examples of communications between a client computing platform 104 and the server 102 shown in FIG. 1 for facilitating a user to obfuscate his/her credential in a credential response in accordance with the disclosure. They will be described with references to FIG. 1. FIG. 2A illustrates one example of receiving a user authentication request. As shown in this example, the user computing platform 104 transmits a user authentication request 202 to the server 102 requesting an authentication of a user associated with the client computing platform 104.

FIG. 2B illustrates an example of transmitting a string sequence to the client computing platform shown in FIG. 2A in response to receiving the user authentication request also shown in FIG. 2A. As shown in this example, in response to the user authentication request 202 being received, the server 102 constructs a string sequence and transmits the string sequence 204 to the client computing platform 104. The string sequence 204 may be presented on the client computing platform 104 to facilitate the user associated with the client computing platform 104 to obfuscate his/her credential in a credential response.

FIG. 2C illustrates an example of transmitting a user credential response provided by the user in response to the string sequence illustrated in FIG. 2B. As shown in this example, the user may provide a credential response 206 as prompted by the string sequence 204 and effectuate a transmission of the credential response 206 to the server 102 for authentication. The server 102, e.g., via the user credential response module may extract a user provided credential and effectuate user authentication based on the extracted user provided credential.

FIG. 3 illustrates an example of constructing a string sequence in accordance with the disclosure. It will be described with references to FIGS. 1-2. As shown in this example, the server 102 receives a user authentication request 202 to authenticate a user. As illustrated, the user authentication request 202 includes user identity information indicating the identity of the user to be authenticated—i.e., user1 in this example. As illustrated, in response to receiving the user authentication request 202, the server 102 obtains prompt character sequence 302 associated with user1 from user profile of the user1. As described above, such a prompt character sequence may be updated periodically. In any case, as shown in this example, the prompt character sequence 302 associated with user1 is "8Ky" and is obtained by the server 102. As also shown, the server 102 obtains a set of noise characters 304 for user1, and composes noise strings 306 that do not contain the prompt character sequence associated with user1—i.e., "8Ky". As also shown, the server 102 composes a set of prompt strings 308 by interspersing the prompt character sequence 302 with the noise characters 304 randomly. As shown, the string sequence 204 may be constructed by the server 102 by scattering the set of prompt strings 308 among the set of noise strings 306.

Figure 4A:
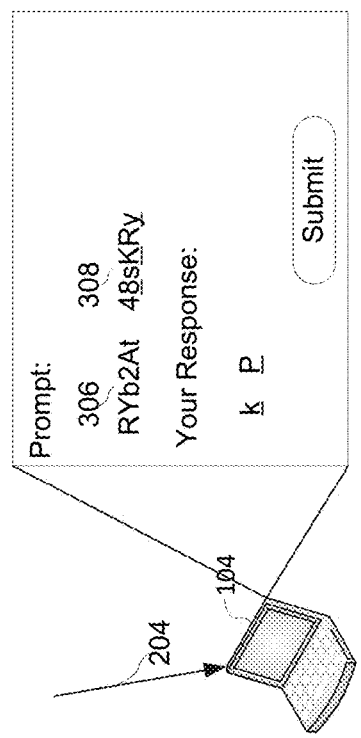
FIG. 4A illustrates an example of user instruction implemented on client computing platform instructing a user to input his/her credential in accordance with a string sequence.
Figure 4B:
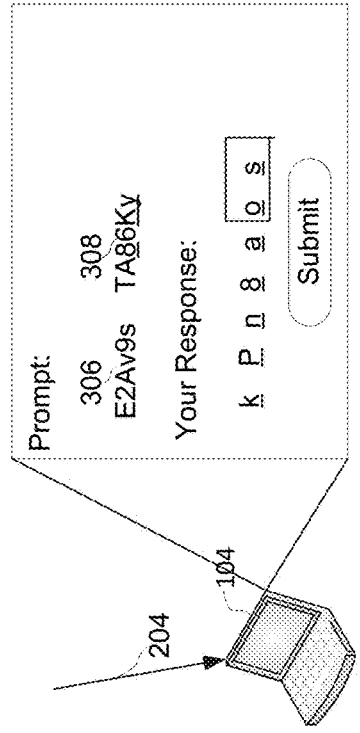
FIG. 4B illustrates an example of presenting the first and second strings in the string sequence on the client computing platform.
Figure 4C:
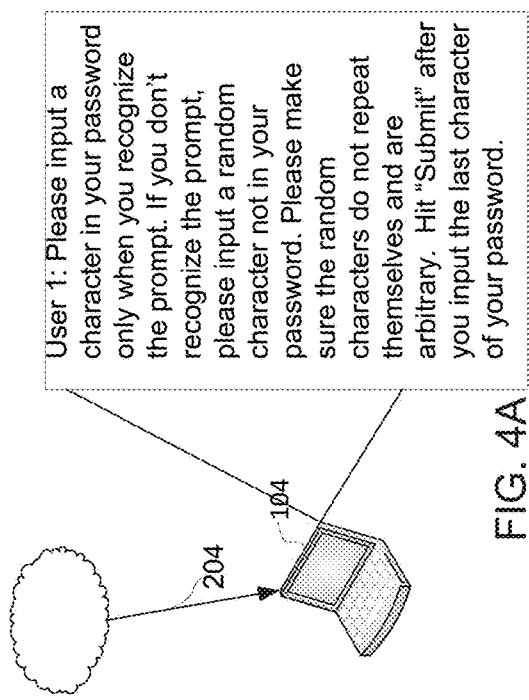
FIG. 4C illustrates an example of presenting the 3rd, 4th, and 5th strings in the string sequence on the client computing platform.
Figure 4D:
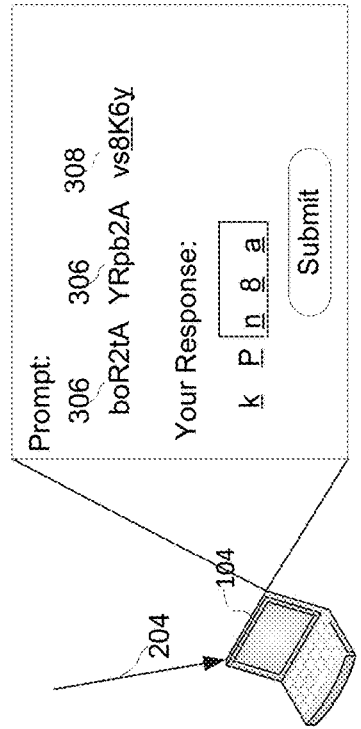
FIG. 4D illustrates an example of presenting the 6th, and 7th string in the string sequence on the client computing platform.

FIGS. 4A-E illustrate an example of presenting the string sequence shown FIG. 3 on a client computer for facilitating a user to provide obfuscated user credential for authentication. They will be described with references to FIGS. 1-3. FIG. 4A illustrates an example of user instruction implemented on client computing platform 104 instructing a user to input his/her credential in accordance with the string sequence 204. As shown in FIG. 4A, the user may be prompted to input characters in response to the prompt strings accordingly. As also shown in FIG. 4A, the user may be prompted not to repeat random characters in their responses and to ensure the random characters are arbitrary. FIG. 4B illustrates an example of presenting the first and second strings in the string sequence 204 on the client computing platform 104. As illustrated, in response to the first string being a noise string 306, the user inputs a random character that is not in his/her credential as instructed by the instruction shown in FIG. 4A. In response to the second string being the prompt string 308—i.e., the user recognizes that the prompt string 308 contains the prompt sequence "8Ky" associated with the user, the user inputs the first character in his/her credential—"P" as illustrated. FIG. 4C illustrates an example of presenting the 3rd, 4th, and 5th strings in the string sequence 204 on the client computing platform 104. As shown, the 3rd and 4th strings are noise strings, and the user inputs two random characters. Since the 5th string is a prompt string containing the prompt character sequence "8Ky", the use recognizes it and inputs the second character in the credential—"a". FIG. 4D illustrates an example of presenting the 6th, and 7th string in the string sequence on the client computing platform 104. As shown the user inputs a random character since the 6th string is a noise string 306 and inputs the third character in the credential since the 7th string is a prompt string 308. FIG. 4E illustrates an example of presenting 8th, 9th and 10th strings in the string sequence 204 on the client computing platform 104. Since the 8th string is a noise string 306, the user inputs a random character. Since the user recognizes that the 9th character is a prompt string containing the prompt character sequence "8Ky", the user inputs the 4th and the last character in the credential. As shown, since the user has finished inputting all of the characters in the credential, the user submits the response as instructed by the instructions shown in FIG. 4A despite that there are more strings, e.g., the 10th string and so on are in the string sequence 204.

FIG. 5 illustrates an example of extracting a user provided credential from a user credential response shown in FIG. 4E. It will be described with references to FIGS. 1-4. As shown, the received user credential response 206 includes obfuscated user credential input by the user in accordance with the string sequence 204 as illustrated in FIGS. 4A-E. As shown, the server 102 may extract user provided credential according to the positions of the prompt strings in the string sequence 204. As shown, the user provided credential 502 extracted by the server 102 is "Pass".

Figure 6:
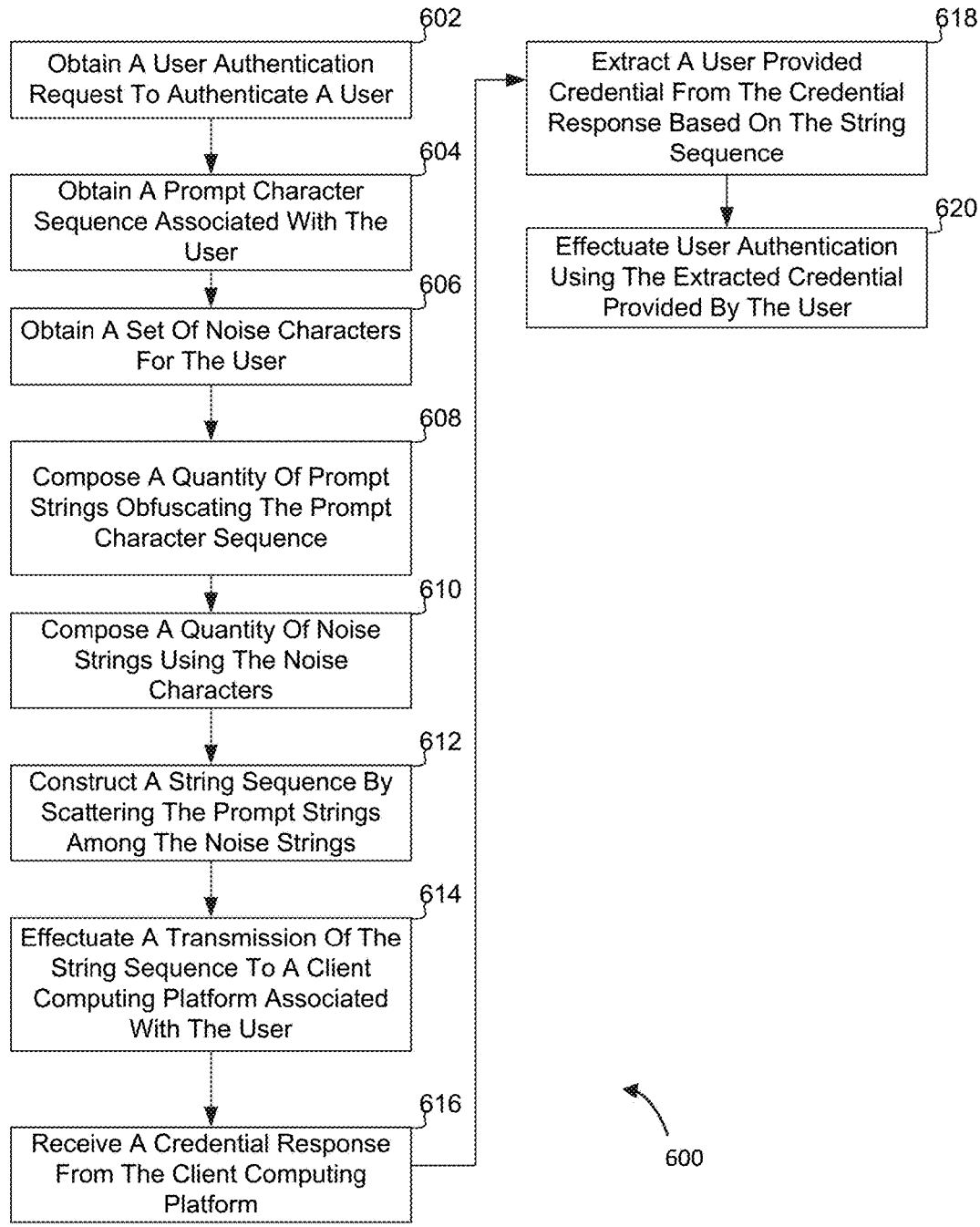
FIG. 6 illustrates an exemplary method of facilitating a user to obfuscate his/her credential in a credential response by using a string sequence in accordance with the disclosure.

FIG. 6 illustrates an exemplary method 600 of facilitating a user to obfuscate his/her credential in a credential response by using a string sequence in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a user authentication request for authenticating a user may be obtained. In some examples, the user authentication request received in operation 602 may initiate an authentication process to authorize a user to access resources and/or services. In some other examples, the user authentication request received in operation 602 may request a confirmation of a user's identity. In any case, a given authentication request received in operation 602 may include user identity information such as a username, a real name of the user, a client computing platform associated with the user, a network interface card registered by the user, an identification number associated with the user, and/or any user identity information. In some implementations, operation 602 may be performed by a user authentication request module similar to or the same as the user authentication request module 114 (shown in FIG. 1 and as described herein).

At an operation 604, a prompt character sequence associated with the user for whom the user authentication request received in operation 602 was made may be obtained. The obtained prompt character sequences associated with the user may comprise alpha-numerical characters, ASCII characters, international characters (e.g., such as Kenji, Big-5, GB, Russian, Korean, and so on), symbols, Unicode code points, and/or any other types of characters. In some exemplary implementations, such prompt character sequence may be determined during registration of a user and stored in the user profile and/or user account associated with the user. In some implementations, operation 604 may be performed by a prompt character sequence module similar to or the same as the prompt character sequence module 116 (shown in FIG. 1 and as described herein).

At an operation 606, a set of noise characters may be obtained for the user for whom the user authentication request received in operation 602 was made. The noise characters obtained in operation 606 may comprise characters that are not in the prompt character sequences obtained in operation 604. In some examples, the noise characters obtained in operation 606 may be from a character class or character classes corresponding to that which make up the characters in the prompt character sequence obtained in the operation 604. For example, in a case where the characters in the prompt character sequence obtained in operation 604 are alpha-numerical, the noise characters obtained in operation 606 may be alpha-numerical. In some implementations, operation 606 may be performed by a noise character module similar to or the same as the noise character module 118 (shown in FIG. 1 and as described herein).

At an operation 608, a quantity of prompt strings may be composed by obfuscating the prompt character sequence obtained in operation 604. For composing the prompt strings, a size of the quantity may be obtained. In some examples, such a size may be predetermined. For example, the quantity may be predetermined being no more than a maximum credential length that is allowed for a user credential. In some exemplary implementations, an individual prompt string may be composed by interspersing the prompt sequence with the noise characters obtained in operation 606. In some examples, the individual prompt strings composed in operation 608 may be of the same length and may be unique with respect to one another. In some implementations, operation 606 may be performed by prompt string module similar to or the same as the prompt string module 120 (shown in FIG. 1 and as described herein).

At an operation 610, a quantity of noise strings may be composed by using the noise characters obtained in the operation 606. The noise strings composed in operation 610 may not comprise the prompt character sequence obtained in operation 604. In some examples, the noise strings composed in operation 610 may have the same length as that of the prompt strings in the prompt string composed in operation 608. In some implementations, operation 610 may be performed by noise string module similar to or the same as the noise string module 122 shown in FIG. 1 and as described herein).

At an operation 612, a string sequence may be constructed by scattering the prompt strings composed in operation 608 among the noise strings composed in operation 610. In some implementations, operation 612 may be performed by string sequence module similar to or the same as the string sequence module 124 shown in FIG. 1 and as described herein).

At an operation 614, a transmission of the string sequence to a client computing platform associated with the user may be effectuated. In some implementations, operation 614 may be performed by string sequence module similar to or the same as the string sequence module 124 shown in FIG. 1 and as described herein).

At an operation 616, a credential response may be received from the client computing platform to which the string sequence was transmitted in operation 614. The user credential response received in operation 616 may include user provided credentials obfuscated among other random characters for user authentication as prompted by the string sequence presented on the client computing platform associated with the user. In some examples, the user credential response may be received by the user credential response module directly from the client computing platform. In some other examples, the user credential response may be relayed from the user client computing platform 104 via an intermediate server, e.g., such as a third party server. In some implementations, operation 616 may be performed by user credential response module similar to or the same as user credential response module 126 shown in FIG. 1 and as described herein).

At an operation 618, a user provided credential may be extracted from the credential response based on the string sequence transmitted to the client computing platform in operation 614. In some implementations, operation 616 may be performed by user credential response module similar to or the same as user credential response module 126 shown in FIG. 1 and as described herein).

At an operation 620, user authentication using the user provided credential extracted in operation 618 may be effectuated. In some implementations, operation 616 may be performed by user credential response module similar to or the same as user credential response module 126 shown in FIG. 1 and as described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate users to provide credentials for user authentication, the system comprising:
one or more processors configured by machine-readable instructions to:
manage user accounts of individual users that comprise user information regarding the individual users, the user information including user credentials for user authentication such that a first user account comprising first user information regarding a first user is managed, the first user information including a first user credential for authenticating the first user;
receive user authentication requests for authenticating users such that a first user authentication request is received to authenticate the first user;
obtain prompt character sequences associated with the individual users for prompting the individual users to provide characters in the user credentials for user authentication such that responsive to the first user authentication request being received, a first prompt character sequence associated with the first user is obtained;
compose prompt strings by obfuscating the obtained prompt character sequences such that responsive to the first prompt character sequence being obtained, a first set of prompt strings is composed by obfuscating the first prompt character sequence;
compose noise strings for obfuscating the composed prompt strings such that responsive to the first set of prompt strings being composed, a first set of noise strings that do not comprise the first prompt character sequence is composed; and
construct string sequences for presentation on client computers by obfuscating the composed prompt strings among the composed noise strings such that responsive to the first set of prompt strings being composed and the first set of noise strings being composed, a first string sequence is composed by obfuscating the first set of prompt strings among the first set of noise strings.

2. The system of claim 1, wherein the one or more processors are further configured by machine-readable instructions to obtain noise characters for obfuscating the prompt character sequences, the obtained noise characters including a first set of noise characters that are not in the first prompt character sequence, such that obfuscating the first prompt character sequence comprises interspersing the first prompt character sequence with the first set of noise characters.

3. The system of claim 1, wherein the one or more processors are further configured by machine-readable instructions to:
receive user credential responses from the client computers associated with the users;
extract user provided credentials from the received user credential responses based on the corresponding string sequences constructed, wherein extracting a first user provided credential from a first user credential response based on the first string sequence comprises:
extracting characters in the first user credential response according to positions of prompt strings in the first string sequence; and
constructing the first user provided credential by joining the extracted characters in an order by which the extracted characters appear in the first user credential response.

4. The system of claim 3, wherein the first user credential response comprises multiple characters and individual ones of the multiple characters correspond to either an individual prompt string or an individual noise string within the first string sequence, such that extracting the first user provided credential from the first user credential response comprises extracting characters that correspond to the prompt strings within the first string sequence wherein a single character corresponds to a single prompt string within the first string sequence.

5. The system of claim 1, wherein the one or more processors are further configured by machine-readable instructions such that the prompt strings in the first set of prompt strings are of the same length, and the noise strings in the first set of noise strings are of the same length as that of the prompt strings in the first set of prompt strings.

6. The system of claim 1, wherein the one or more processors are further configured by machine-readable instructions such that the number of noise strings in the first set of noise strings are three times the number of prompt strings in the first set of prompt strings.

7. The system of claim 1, wherein the one or more processors are further configured by machine-readable instructions such that the first set of noise strings comprise at least one character sequence different from the first prompt character sequence multiple times.

8. The system of claim 1, wherein the one or more processors are configured by machine-readable instructions such that prompt characters in the first prompt character sequence are alpha-numerical characters.

9. The system of claim 1, wherein the one or more processors are configured by machine-readable instructions such that the first prompt character sequence is three characters long.

10. A method for facilitating users to provide credentials for user authentication, the method being implemented in a physical processor configured by machine-readable instructions, the method comprising:
managing user accounts of individual users that comprise user information regarding the individual users, the user information including user credentials for user authentication such that a first user account comprising first user information regarding a first user is managed, the first user information including a first user credential for authenticating the first user;
receiving user authentication requests for authenticating users such that a first user authentication request is received to authenticate the first user;
obtaining prompt character sequences associated with the individual users for prompting the individual users to provide characters in the user credentials for user authentication such that responsive to the first user authentication request being received, a first prompt character sequence associated with the first user is obtained;
composing prompt strings by obfuscating the obtained prompt character sequences such that responsive to the first prompt character sequence being obtained, a first set of prompt strings is composed by obfuscating the first prompt character sequence;
composing noise strings for obfuscating the composed prompt strings such that responsive to the first set of prompt strings being composed, a first set of noise strings that do not contain the first prompt character sequence is composed; and
constructing string sequences for presentation on client computers by obfuscating the composed prompt strings among the composed noise strings such that responsive to the first set of prompt strings being composed and the first set of noise strings being composed, a first string sequence is composed by obfuscating the first set of prompt strings among the first set of noise strings.

11. The method of claim 10, further comprising obtaining noise characters for obfuscating the prompt character sequences, the obtained noise characters including a first set of noise characters that are not in the first prompt character sequence, and wherein obfuscating the first prompt character sequence comprises interspersing the first prompt character sequence with the first set of noise characters.

12. The method of claim 10, further comprising:
receiving user credential responses from the client computers associated with the users; and
extracting user provided credentials from the received user credential responses based on the corresponding string sequences constructed, wherein extracting a first user provided credential from a first user credential response based on the first string sequence comprises:
extracting characters in the first user credential response according to positions of prompt strings in the first string sequence; and
constructing the first user provided credential by joining the extracted characters in an order by which the extracted characters appear in the first user credential response.

13. The method of claim 12, wherein the first user credential response comprises multiple characters and individual ones of the multiple characters correspond to either an individual prompt string or an individual noise string within the first string sequence, such that extracting the first user provided credential from the first user credential response comprises extracting characters that correspond to the prompt strings within the first string sequence wherein a single character corresponds to a single prompt string within the first string sequence.

14. The method of claim 10, wherein the prompt strings in the first set of prompt strings are of the same length, and wherein the noise strings in the first set of noise strings are of the same length as that of the prompt strings in the first set of prompt strings.

15. The method of claim 10, wherein the number of noise strings in the first set of noise strings are three times the number of prompt strings in the first set of prompt strings.

16. The method of claim 10, wherein the first set of noise strings comprise at least one character sequence different from the first prompt character sequence multiple times.

17. The method of claim 10, wherein prompt characters in the first prompt character sequence are alpha-numerical characters.

18. The method of claim 10, wherein the first prompt character sequence is three characters long.

* * * * *